US005334403A

United States Patent [19]

de Maillard

[11] Patent Number: 5,334,403

[45] Date of Patent: Aug. 2, 1994

[54] METHOD AND DEVICE FOR APPLYING MICROWAVES TO PRODUCTS, ESPECIALLY FOR DRYING, REHEATING AND DEFREEZING SAID PRODUCTS

[76] Inventor: Etienne de Maillard, 21 allée Verte Campagne, F-33140 Villenave D'Ornon, France

[21] Appl. No.: 49,371

[22] Filed: Apr. 21, 1993

[51] Int. Cl.[5] ............................ A23L 1/00; H05B 6/00

[52] U.S. Cl. ...................................... 426/241; 34/259; 99/451; 219/678; 219/690; 219/702; 426/242; 426/524

[58] Field of Search ........................ 426/241, 242, 524; 219/678, 690, 702, 725; 99/451, DIG. 14; 34/1 P

[56] References Cited

U.S. PATENT DOCUMENTS

| | | | |
|---|---|---|---|
| 3,056,877 | 10/1962 | Schmidt et al. | 219/10.47 |
| 3,867,606 | 2/1975 | Peterson | 219/10.55 |
| 4,622,448 | 11/1986 | Awata | 219/10.55 |

FOREIGN PATENT DOCUMENTS

| | | | |
|---|---|---|---|
| 2494562 | 5/1982 | France . | |
| WO9015536 | 12/1990 | PCT Int'l Appl. . | |
| 2162728A | 2/1986 | United Kingdom | 426/241 |

*Primary Examiner*—George Yeung

*Attorney, Agent, or Firm*—Roylance, Abrams, Berdo & Goodman

[57] ABSTRACT

A method and apparatus defreeze, reheat and dry products in a closed chamber by moving a microwave source above a layer of product in a to-and-from motion at a specific, constant height from the product layer.

8 Claims, 4 Drawing Sheets

Figure 1:
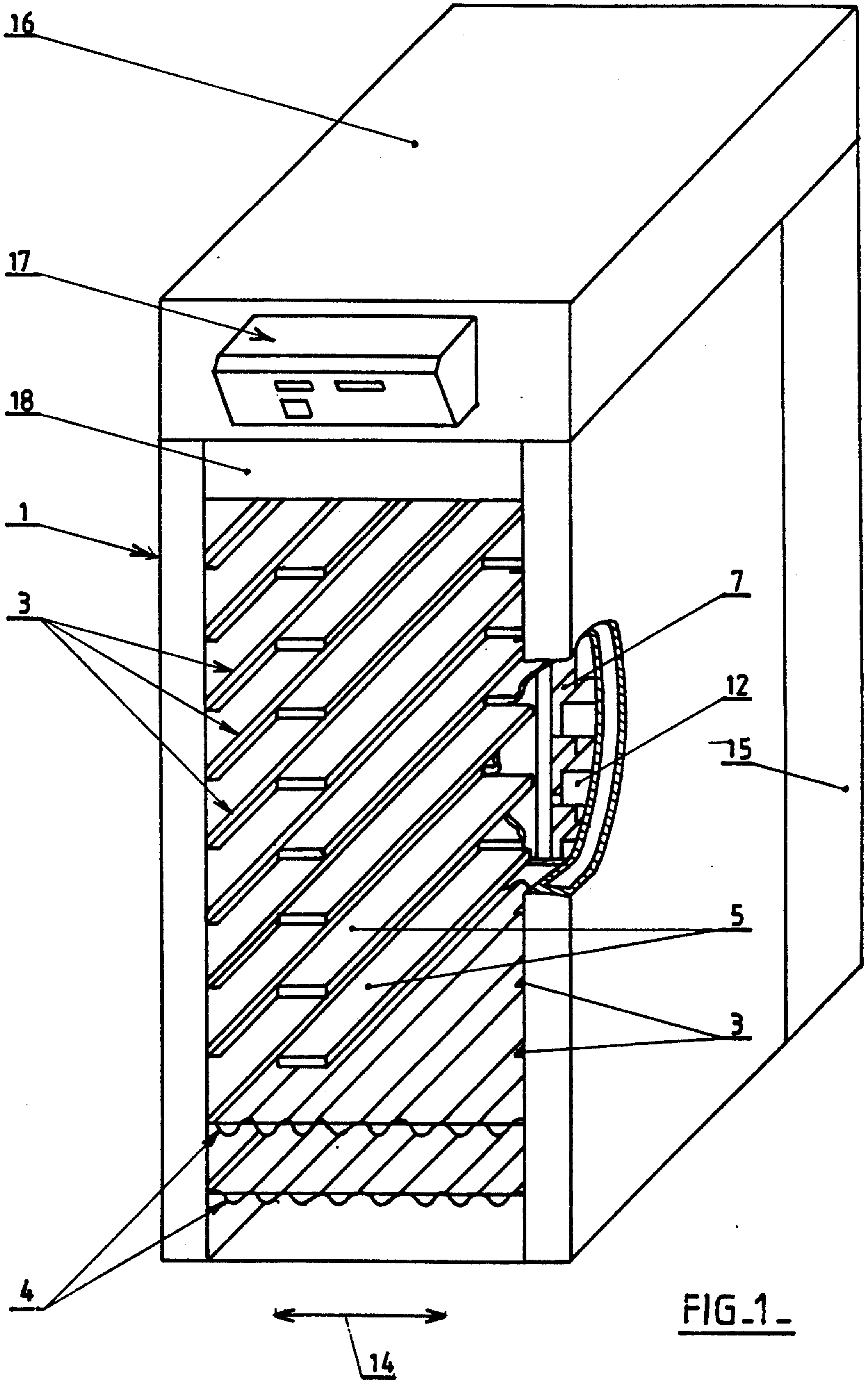

METHOD AND DEVICE FOR APPLYING MICROWAVES TO PRODUCTS, ESPECIALLY FOR DRYING, REHEATING AND DEFREEZING SAID PRODUCTS

The present invention concerns a new method for applying microwaves to various products, food or otherwise, so as to dry, reheat or defreeze them.

Although the invention is more particularly applicable to the accelerated fermenting and defreezing of bakery and Viennese bread products and specially frozen raw small pastries with one application example concerning this field to be described subsequently, the method of the invention may be applied to all sorts of other products, namely solid or liquid food or non-food products, so as to defreeze, reheat or dry them.

Generally speaking, the aim of the invention is to reduce the periods for irradiating products submitted to microwaves whilst ensuring greater homogeneity of the irradiation field, especially when the product(s) to be treated occupies or occupy a relatively large amount of space inside the chamber where irradiation takes place.

New breadmaking techniques in the bakery field are being developed by using intermediate products which are either raw frozen small pastries or precooked products. These products are preserved by the cold for a relatively long period before being cooked.

Raw frozen small pastries, which currently represent the main portion of this market, may be preserved in a cold chamber at −20° C. for an extremely long period of time.

Before using them, it is necessary to defreeze them and allow them to ferment before placing them in the baking oven.

The consumption of frozen raw small pastries is developing rapidly, especially in supermarket or hypermarket bakeries known as "cooking terminals" as this makes it possible to have frozen in reserve and cook them to meet current demand.

One of the main drawbacks of this system resides in the period of time required once this product leaves the freezer and when it is placed in the oven.

As regards the equipment and techniques existing on the market, this average period is currently three hours.

In the cooking terminals, the equipment normally used consists of baking ovens with a trolley, as well as controlled fermentation chambers or ovens with a trolley.

When this period is exceptionally reduced to almost two hours, this is effected by significantly increasing the temperatures involved. This results in significantly decreasing the quality of the products obtained which lack flavour and become irregular as regards shape.

In the bakery and Viennese bread fields, if microwaves are already used, this mainly occurs in tunnels in which the products move forward onto belts. Such systems take up a large amount of space and cannot be used in cooking terminals where solely trolley systems are economically envisageable.

Furthermore, they do not make it possible to obtain homogeneous irradiation fields and quality and a constancy of quality of the processed products, the frozen small pastries being extremely fragile. In fact, these systems leave a lot to be desired as they do not satisfy the economic critera of a rational industrial work operation.

The aim of the present invention, more particularly concerning the bakery and Viennese bread field, is to substantially reduce the average period of defreezing and swelling whilst ensuring good quality of products by processing a substantial number of individual products in a single operation.

To this effect, the invention concerns a method for applying microwaves to products for the purpose of defreezing, reheating or drying them, wherein it consists of placing the product(s) to be processed on at least one layer or sheet in an appropriate closed chamber and moving a microwave source above and to a specific constant distance from said layer so as to scan the entire extent of the layer in at least one backward and forward movement, the source movement speed parameters, passage number and intensity of the microwave radiation being adjustable according to the type of product and the sought-after effects.

The method of the invention is especially applicable to the accelerated fermentation and defreezing of raw frozen small pastries which are advantageously disposed on cooking nets placed on several stages on at least one trolley introduced into an appropriate chamber where the microwaves are generated by as many antenna-generator units as there are net stages disposed in such a way that said antennae each move above one net so as to scan it from one side to the other.

This type of method is able to reduce the average period of defreezing and swelling to about one hour fifteen minutes whilst preserving good product quality.

Figure 2:
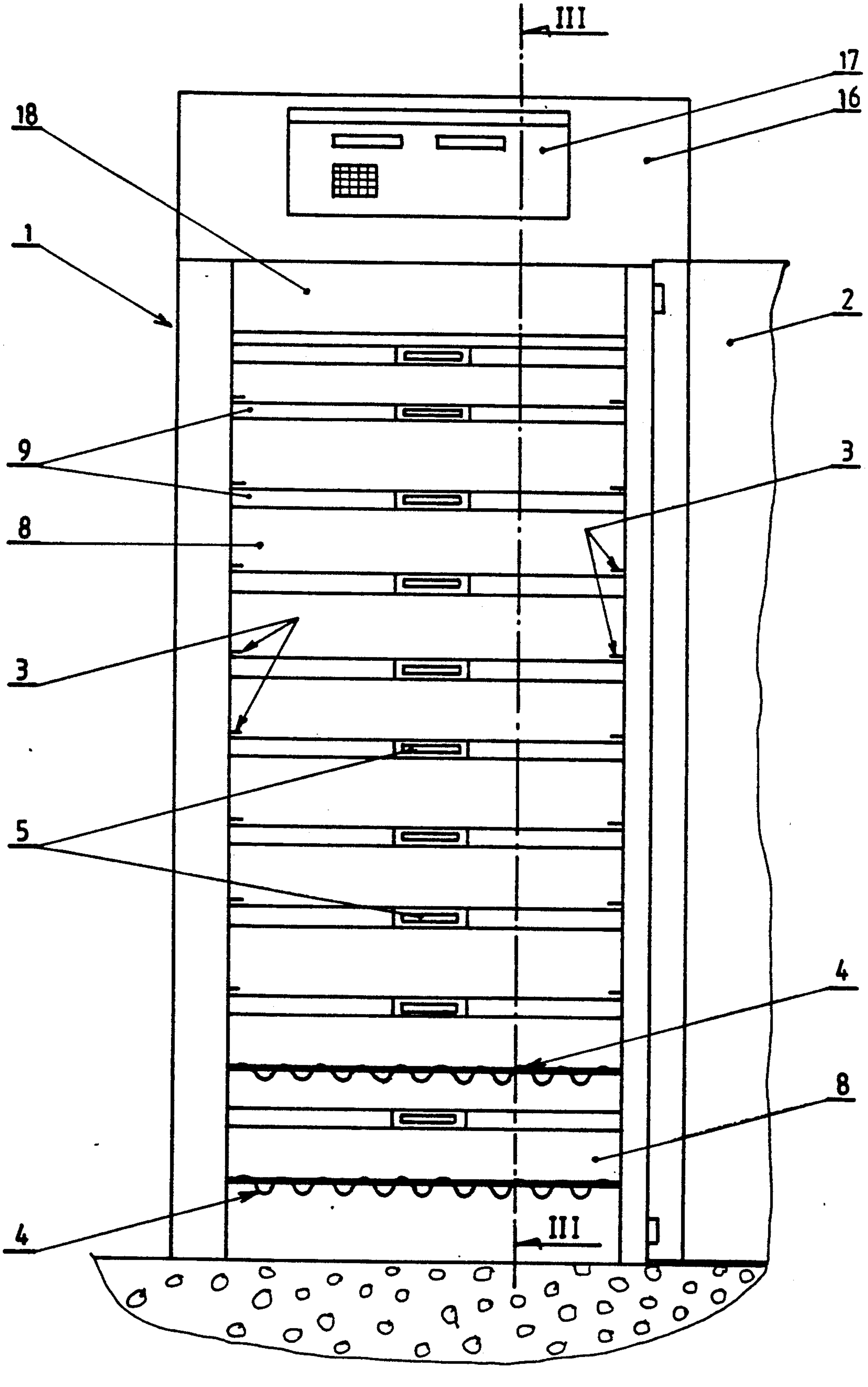
Figure 3:
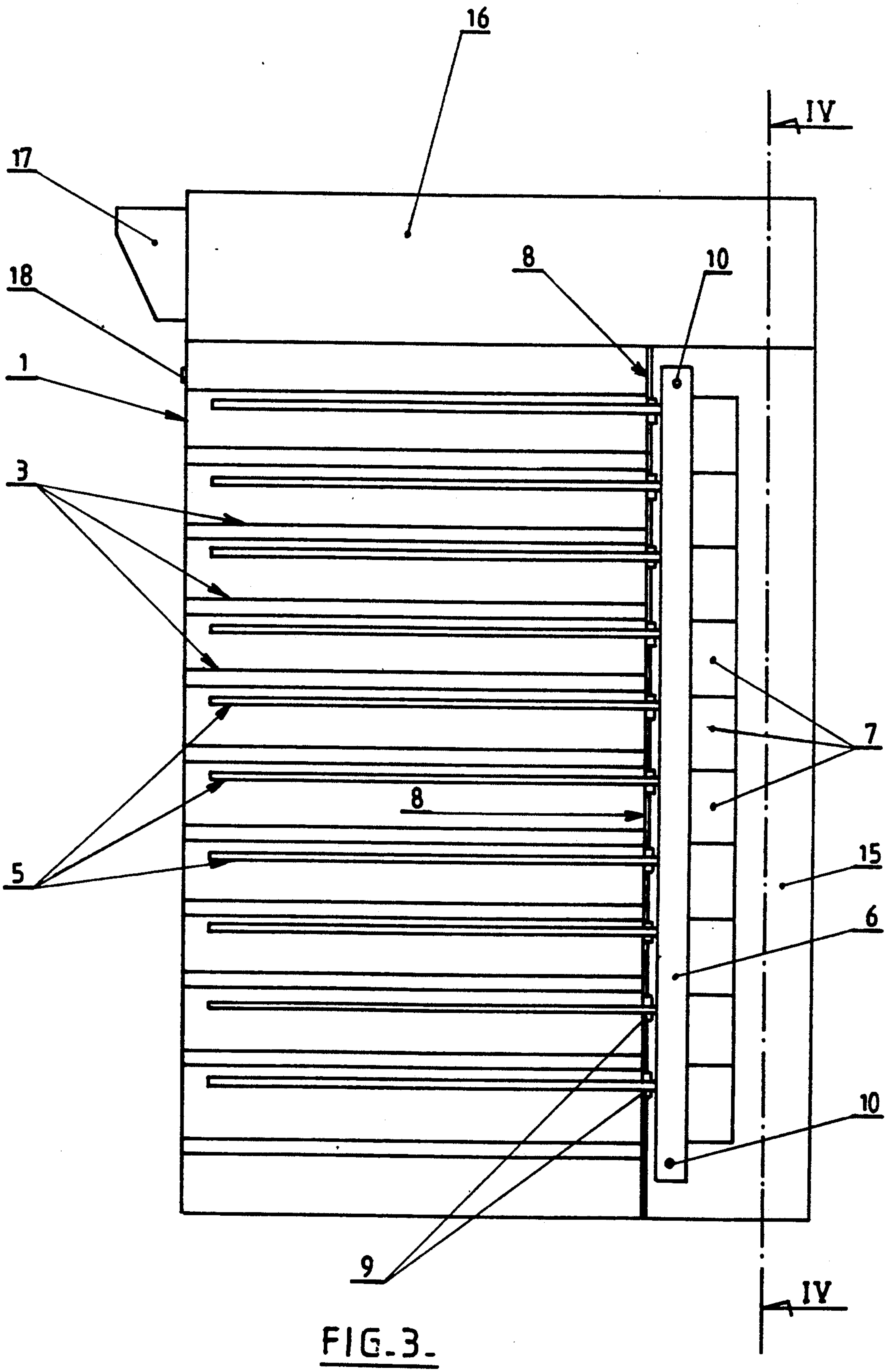
Figure 4:
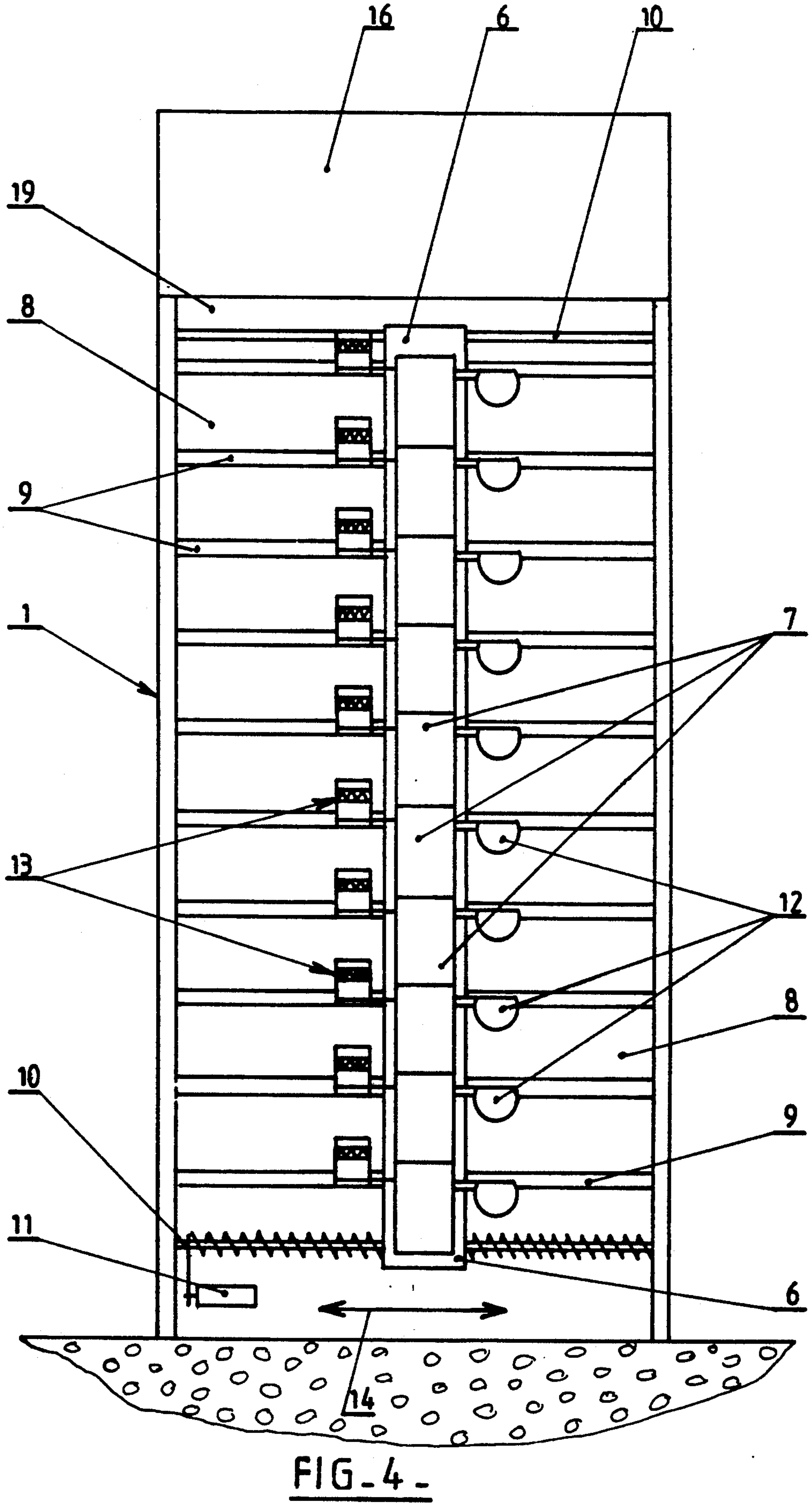

Other characteristics and advantages shall appear more readily from a reading of the following description of one embodiment of the device of the invention applied to the defreezing and fermentation of frozen raw small pastries, said description being solely given by way of example with reference to the accompanying drawings on which:

FIG. 1 is a diagrammatic perspective front three-quarter view of a controlled fermentation chamber for implementing the method of the invention, FIG. 2 is a front view of the chamber of FIG. 1, FIG. 3 is a vertical righthand cutaway view along the line III—III of the chamber of FIG. 2, and FIG. 4 is a righthand view along the line IV—IV of the chamber of FIG. 3.

The device shown on FIGS. 1 to 4 includes a heat-insulated microwave-proof parallelpiped metallic chamber 1 provided on its front facade with a solid or glazed door partially shown at 2 solely on FIG. 2. If the door 2 is glazed, a grating is provided at the right of the glazing so as to prevent the passage of waves.

In the embodiment shown, the interior of the chamber 1 is provided with horizontal slides 3 secured to the lateral walls so as to receive a set of cooking nets 4 disposed horizontally on top of one another and at an equal distance from one another.

The wave-shaped nets 4 are conventional and are metallized or made of aluminium.

When the nets 4 are in place on the slides 3, they delimit between them a gap in which an antenna or horizontal wave guide 5 is able to move and extending virtually over the entire length of the net 4.

In the embodiment shown, the antenna 5 are parallel to the lateral walls of the chamber and secured at their rear extremity to an antenna carrier column 6, magnetrons 7 also being secured to said column, each magnetron being opposite one antenna 5.

The antennae 5 traverse an isolation separating partition 8 delimiting the bottom of the chamber and pierced with elongated horizontal windows 9.

The column 6 is mounted sliding on two parallel horizontal rods 10, movement being ensured, for example, (FIG. 4) by a fixed electric motor 11 driving the lower rod 10 which is a threaded rod cooperating with a driving nut integral with the column 6.

FIG. 4 shows at 12 ventilators for cooling the magnetrons 7 and at 13 electric transformers for feeding the magnetrons.

The column 6 and its accessories, as well as its horizontal translation displacement means for moving to-and-fro along the double arrow 14 (FIG. 1 and 4 are housed in a sealed compartment 15 disposed at the rear of the chamber.

Disposed in a compartment 16 at the upper portion of the chamber is the air-conditioning unit intended to keep the products at a negative temperature if required and delay triggering fermentation.

FIGS. 1, 2 and 3 show at 17 the external command and control members of the air-conditioning unit.

Hygrometry and temperature probes (not shown) are disposed at suitable locations inside the chamber and connected to the air-conditioning unit so as to satisfy the required regulations.

Finally, shown at 18 and 19 respectively are safety contacts cutting off the electric supply should opening occur of the front door 2 or trapdoor (not shown) with access to the rear compartment 15 of the chamber.

The antennae 5 comprise slits for diffusing waves onto the products disposed on the cooking nets 4 and are disposed in such a way so as to obtain the greatest possible homogeneity when the antennae 5 move backwards and forwards above the nets.

The power of the magnetrons 7 may be adjusted so as to obtain various production cycles adapted to various products.

The command and control panel 17 also contains the devices for commanding, adjusting and controlling the various parameters of the microwave irradiation process, namely, apart from controlling the power of the magnetrons, controlling the displacement speed of the column 6, the return scanning number of products by the antennae 5 or the continuous or intermittent scanning according to a predisplayed programme.

The windows 9 may possibly be provided with a device avoiding or reducing the passage of waves inside the chamber in the direction of the magnetrons, this device not impeding with the movement of the antennae 5.

The ventilators 12 may be replaced by a single ventilation system ensuring cooling of all the magnetrons and being mounted on the column 6.

The fermentation chamber of the invention may advantageously be used in cooking terminals.

To this effect, the inside of the chamber has been designed so as to receive one or several conventional trolleys bearing cooking nets 4, the disposition of the antennae 5 being of course provided so as to allow for the trolley(s) to be fully introduced into the chamber with one antenna being inserted in the gap between two consecutive superimposed nets of each trolley.

The chamber is provided with means for guiding and ensuring the correct positioning of the trolley(s) inside.

If, for example, two trolleys are be housed side by side inside a given chamber, a single antenna could scan the two trolleys by disposing the latter in such a way as to allow for this movement of the antenna.

Furthermore, the invention is not merely limited to the embodiment shown and described above, but, on the contrary, covers all possible variants, especially as regards the means for the translation displacement of the antennae 5, the nature and disposition of the supports (plates or similar elements) of the products to be treated, as well as the nature and disposition of the processing chamber.

Finally, the method of the invention is applicable to the defreezing, reheating or drying of any product, whether it be liquid or solid, made all in one piece or of individual elements or in pieces or a particular piece and, if required, in bulk to the extent that it is possible to move an antenna, wave guide or similar device and to a roughly constant distance from the surface of the product or product layer.

I claim:

1. A method of applying microwaves for defreezing, reheating or drying products, comprising the steps of:
   disposing product to be treated on a least one layer in a closed chamber, the layer having an extent;
   moving a microwave source above and at a specific constant distance from the layer to scan the extent of the layer in at least one to-and-from movement; and
   varying microwave source movement speed, passage number and microwave radiation intensity according to product type and treatment.

2. A method according to claim 1 wherein raw and frozen small pastries for defreezing and fermentation are disposed on nets placed directly in the closed chamber.

3. A method according to claim 1 wherein raw and frozen small pastries for defreezing and fermentation are placed in the closed chamber indirectly by introducing trolleys into the closed chamber.

4. A device for applying microwaves for defreezing, reheating or drying products, comprising:
   a heat-insulated, metallic, waveproof sealed chamber with an access device;
   product receiving means, located inside said chamber, for maintaining product to be treated in at least one layer;
   a microwave source coupled to carrier means for moving said microwave source in at least a to-and-fro movement and for supporting said microwave source at a specific constant height above said product receiving means; and
   control means, coupled to said microwave source and said carrier means, for commanding, adjusting and controlling parameters of irradiation and movement.

5. A device according to claim 4 wherein
   said microwave source comprises several parallel antennae;
   said carrier means comprises a horizontally mobile support having magnetrons secured thereto; and
   an isolation separating partition is disposed in said chamber between said antennae and said mobile support, said partition having windows for passage of said antennae through said partition.

6. A device according to claim 5 wherein
   said product receiving means comprises slides secured to internal walls of said chamber, said slides receiving plates for supporting the product to be treated, said plates being disposed parallel to one another and spaced by equal distances to define gaps between adjacent plates in which said antennae move to-and-fro.

7. A device according to claim 5 wherein said product receiving means comprise independent trolleys supporting the product in several superimposed layers spaced at equal distances from one another; and said chamber comprises means for guiding and positioning said trolley in said chamber to permit said antennae to move between adjacent product layers.

8. A device according to claim 5 when said windows comprise means for reducing passage of waves therethrough.

* * * * *